United States Patent
Jung et al.

(10) Patent No.: US 8,209,725 B2
(45) Date of Patent: Jun. 26, 2012

(54) METHOD FOR PROVIDING GRAPHICAL USER INTERFACE FOR SELECTING BROADCAST PROGRAM AND AV APPARATUS THEREFOR

(75) Inventors: Jae-yoon Jung, Suwon-si (KR);
Hye-young Seong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 494 days.

(21) Appl. No.: 12/024,462

(22) Filed: Feb. 1, 2008

(65) Prior Publication Data
US 2009/0049476 A1 Feb. 19, 2009

(30) Foreign Application Priority Data
Aug. 14, 2007 (KR) ........................ 10-2007-0081934

(51) Int. Cl.
*H04N 5/445* (2011.01)
(52) U.S. Cl. ................ 725/58; 725/39; 725/40; 725/44; 715/790
(58) Field of Classification Search ................ None
See application file for complete search history.

(56) References Cited

U.S. PATENT DOCUMENTS

| | | | |
|---|---|---|---|
| 5,585,838 A * | 12/1996 | Lawler et al. | 725/54 |
| 6,025,837 A | 2/2000 | Matthews, III et al. | |
| 7,062,777 B2 * | 6/2006 | Alba et al. | 725/39 |
| 7,096,486 B1 | 8/2006 | Ukai et al. | |
| 7,584,497 B2 * | 9/2009 | Potrebic et al. | 725/116 |
| 2003/0115604 A1 * | 6/2003 | Yamamura et al. | 725/55 |
| 2003/0154484 A1 | 8/2003 | Plourde, Jr. et al. | |
| 2004/0139465 A1 | 7/2004 | Matthews, III et al. | |
| 2004/0218905 A1 * | 11/2004 | Green et al. | 386/83 |

FOREIGN PATENT DOCUMENTS

| | | |
|---|---|---|
| EP | 1594318 A1 | 11/2005 |
| WO | 01/89206 A2 | 11/2001 |

OTHER PUBLICATIONS

Communication from the State Intellectual Property Office of P.R. China, dated Nov. 15, 2011, issued in counterpart Chinese Application No. 200810108910.6.

* cited by examiner

*Primary Examiner* — Kristine Kincaid
*Assistant Examiner* — Oschta Montoya
(74) *Attorney, Agent, or Firm* — Sughrue Mion, PLLC

(57) ABSTRACT

A method for providing a GUI for selecting a broadcast program, and an AV apparatus are provided. According to the method for providing a GUI, a user selection regarding the broadcast programs that cannot be simultaneously selected is set according to a user operation that is input in an area containing graphics representing broadcast programs that cannot be simultaneously selected by a user. Therefore, if a user makes errors in selecting broadcast programs, for example, if a user selects two or more broadcast programs that cannot be simultaneously selected, the errors may be corrected more easily, instantly and intuitively.

16 Claims, 21 Drawing Sheets

METHOD FOR PROVIDING GRAPHICAL USER INTERFACE FOR SELECTING BROADCAST PROGRAM AND AV APPARATUS THEREFOR

CROSS-REFERENCE TO RELATED APPLICATIONS

This application claims priority from Korean Patent Application No. 10-2007-0081934, filed on Aug. 14, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to providing a graphical user interface (GUI), and more particularly, to providing a GUI through which a user may input commands and selection.

2. Description of the Related Art

The recent development of video processing and broadcasting technologies has led to the emergence of digital broadcasting, by which users may view high quality broadcast programs. Additionally, digital broadcasting enables users to check the organization of broadcast programs or detailed information regarding broadcast programs through displays of digital televisions (DTVs).

Electronic Program Guides (EPGs) enable checking detailed information regarding broadcast programs. Accordingly, users may select a broadcast program which they desire to view using the EPG, in order to schedule viewing. However, as the number of broadcast channels has increased, the number of broadcast programs arranged in EPGs has also increased, which has caused EPGs to become more complicated.

Users select broadcast programs using EPGs, so if EPGs are complicated, it is difficult for users to select broadcast programs. Additionally, in a DTV having no picture-in-picture (PIP) function, it is impossible for a user to select two or more broadcast programs broadcast in the same time slot using the EPG (for example, if a user wishes to select a program broadcast at 2:00-3:00 on "channel 1" and a program broadcast at 2:30-3:30 on "channel 2").

Such a DTV provides only one broadcast program at a time, so there is a need for methods which correct selection errors by the user. The more intuitive such methods and the easier they are to use, the more users prefer the methods.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for providing a graphical user interface (GUI) and an audio visual (AV) apparatus using the same which enable a user to more easily assign priority to broadcast programs or other items when selecting broadcast programs or other items, so that it is possible to easily correct selection errors by the user.

According to an aspect of the present invention, there is provided a method for providing a graphical user interface (GUI), the method comprising providing a GUI which displays graphics representing broadcast programs; receiving a user operation that is input in an area containing graphics representing broadcast programs that cannot be simultaneously selected from among the broadcast programs displayed by the GUI; and setting a user selection regarding the broadcast programs that cannot be simultaneously selected, according to the received user operation.

The GUI may comprise an electronic program guide (EPG), which displays the graphics representing the broadcast programs.

The broadcast programs that cannot be simultaneously selected, are in broadcast time slots which at least partially overlap.

The broadcast programs that cannot be simultaneously selected may comprise a first broadcast program and a second broadcast program. The area may comprise at least a part of an area containing graphics representing the first broadcast program, which overlaps a broadcast time slot of the second broadcast program; a part of an area containing graphics representing the second broadcast program which overlaps a broadcast time slot of the first broadcast program; another part of the area containing the graphics representing the first broadcast program, which does not overlap the broadcast time slot of the second broadcast program; and another part of the area containing the graphics representing the second broadcast program, which does not overlap the broadcast time slot of the first broadcast program.

The broadcast programs that cannot be simultaneously selected may comprise a first broadcast program and a second broadcast program. The setting the user selection comprises selecting one among the first broadcast program, the second broadcast program, the first broadcast program and a portion of the second broadcast program not overlapping a broadcast time slot of the first broadcast program, and the second broadcast program and a portion of the first broadcast program not overlapping a broadcast time slot of the second broadcast program.

The user operation may comprise selecting the area containing the graphics representing broadcast programs that cannot be simultaneously selected, using a pointer displayed on the GUI.

The method may further comprise performing at least one of scheduled viewing and scheduled recording of the broadcast program according to the set user selection.

According to another aspect of the present invention, there is provided an audio visual (AV) apparatus comprising a graphical user interface (GUI) generator which generates a GUI and combines the GUI with a video to be displayed; and a controller which controls the GUI generator to generate a GUI which displays graphics representing broadcast programs, and which sets a user selection regarding broadcast programs that cannot be simultaneously selected, according to a user operation that is input in an area containing graphics representing the broadcast programs that cannot be simultaneously selected.

The GUI may comprise an electronic program guide (EPG), which displays the graphics representing the broadcast programs.

The broadcast programs that cannot be simultaneously selected, are in broadcast time slots which at least partially overlap.

The broadcast programs that cannot be simultaneously selected may comprise a first broadcast program and a second broadcast program. The area may comprise at least a part of an area containing graphics representing the first broadcast program, which overlaps a broadcast time slot of the second broadcast program; a part of an area containing graphics representing the second broadcast program which overlaps a broadcast time slot of the first broadcast program; another part of the area containing the graphics representing the first broadcast program, which does not overlap the broadcast time slot of the second broadcast program; and another part of the area containing the graphics representing the second broadcast program, which does not overlap the broadcast time slot of the first broadcast program.

The broadcast programs that cannot be simultaneously selected may comprise a first broadcast program and a second broadcast program. The controller may set a user selection by selecting one among the first broadcast program, the second broadcast program, the first broadcast program and a portion of the second broadcast program not overlapping a broadcast time slot of the first broadcast program, and the second broadcast program and a portion of the first broadcast program not overlapping a broadcast time slot of the second broadcast program.

The user operation may comprise selecting the area containing the graphics representing broadcast programs that cannot be simultaneously selected, using a pointer displayed on the GUI.

The controller may perform at least one of scheduled viewing and scheduled recording of the broadcast program according to the set user selection.

According to another aspect of the present invention, there is provided method for providing a graphical user interface (GUI), the method comprising providing a GUI which displays items; receiving a user operation that is input in an area containing items that cannot be simultaneously selected by a user; and setting a user selection regarding the items that cannot be simultaneously selected, according to the received user operation.

The items that cannot be simultaneously selected may have overlapping times of execution.

BRIEF DESCRIPTION OF THE DRAWINGS

The above aspects and other aspects of the present invention will become apparent and more readily appreciated from the following description of the exemplary embodiments, taken in conjunction with the accompany drawings, in which.

DETAILED DESCRIPTION OF EXEMPLARY EMBODIMENTS OF THE INVENTION

Figure 1A:
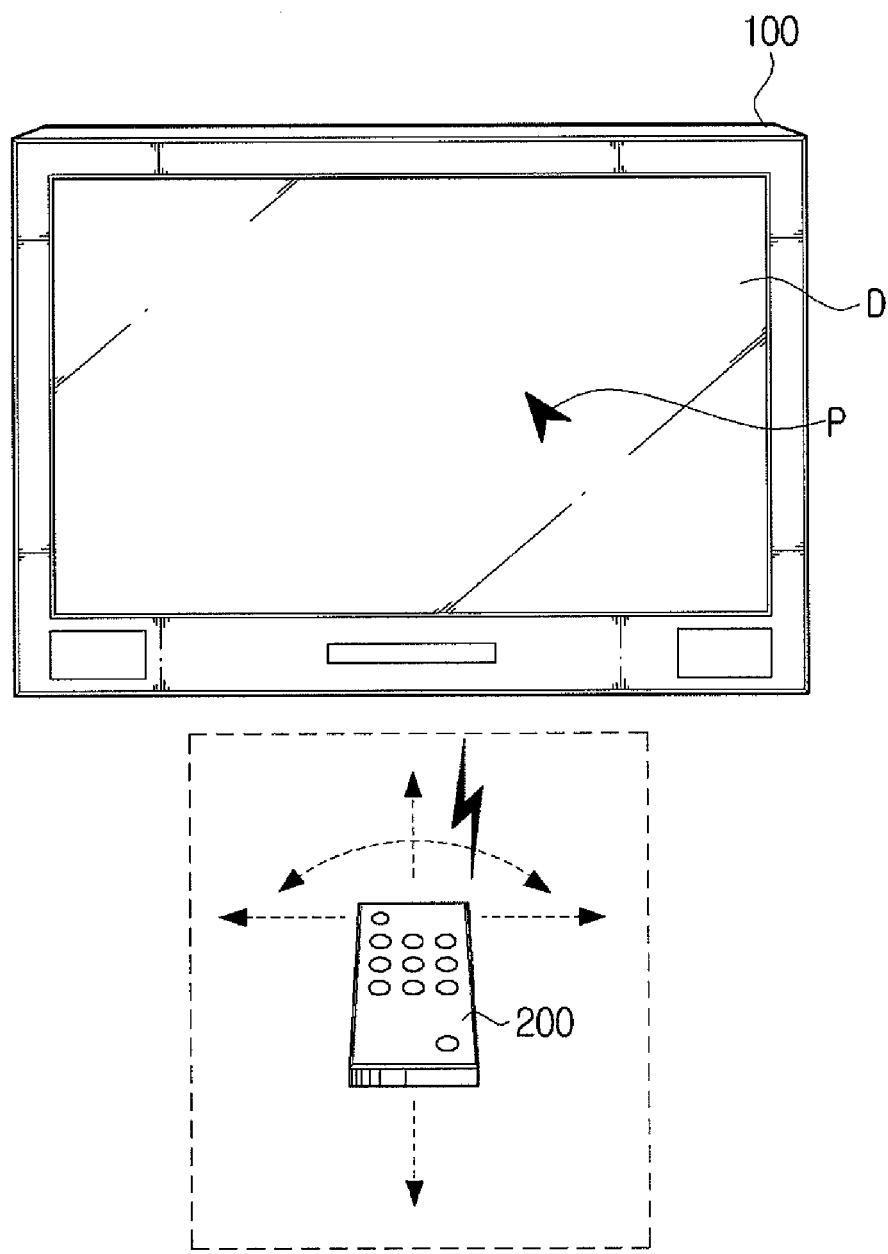
FIGS. 1A to 1C are views showing a broadcast receiving system according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1A shows a broadcast receiving system to which the present invention is applicable. The broadcast receiving system of FIG. 1A comprises a digital television (DTV) 100 as a broadcast receiving device, and a remote controller 200 as a user input device.

The DTV 100 provides a user with broadcasts received via a wired or wireless connection, through a display D. The DTV 100 may also provide a user with an external input received from an external device, which is connected via a wired or wireless connection, through the display D. Additionally, the DTV 100 may play back broadcasts stored in a built-in storage medium to provide a user with the broadcasts.

The DTV 100 may store the received broadcast in the built-in storage medium, or may transmit the received broadcast to an external device having a recording function which is connected to the DTV 100 so that the received broadcast may be recorded.

The remote controller 200 sends information regarding operation by the user to the DTV 100, and the DTV 100 operates according to the received input commands.

As indicated by dotted arrows in FIG. 1A, the front end of the remote control 200 may be moved in a space by the user in an upwards or downwards direction, or to the left or right, or in a direction combining two of these directions, such as an upper-leftwards direction, for instance. That is, the front end of the remote control 200 may be moved in any direction.

Figure 1B:
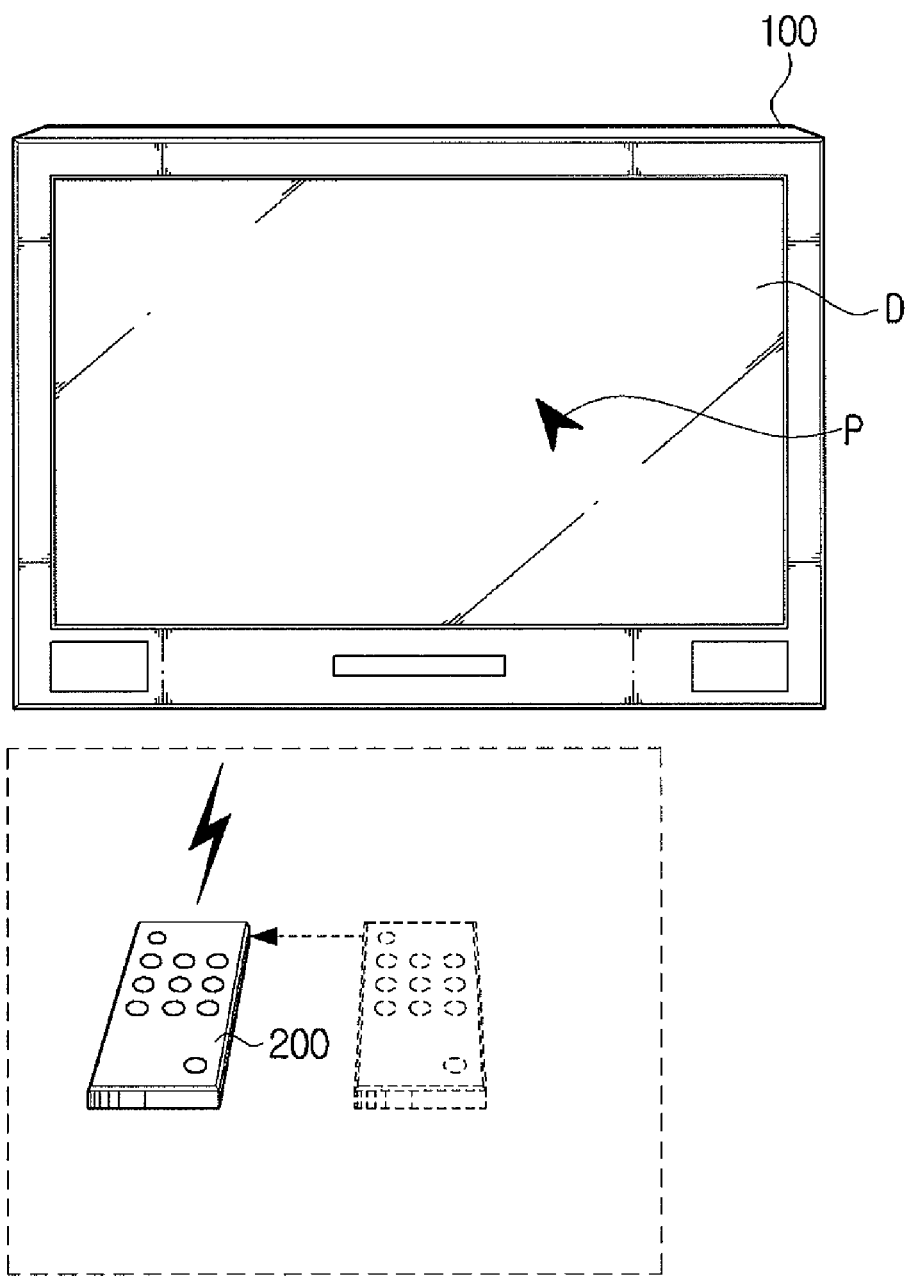

For example, the front end of the remote control 200 may be moved while drawing a locus on a virtual plane (VP) which is in a parallel relation with a screen of the display D. FIG. 1B shows a situation in which the front end of the remote control 200 is moved to the left direction while drawing a locus on a virtual plane which is in a parallel relation with the screen of the display D by the user.

The VP may not be in a perfect parallel relation with the screen of the display D, and may not be a perfect plane. That is, it is practically impossible for the movement of the front end of the remote control 200 by the user to be on a perfect plane and in a perfect parallel relation with the screen of the display D.

Accordingly, the present invention may be applicable to a situation in which the front end of the remote control 200 moves on an imperfect plane and in an imperfect parallel relation with the screen of the display D.

A user may move the front end of the remote control 200 by turning only his wrist while his arm holding the remote control 200 is fixed.

Figure 1C:
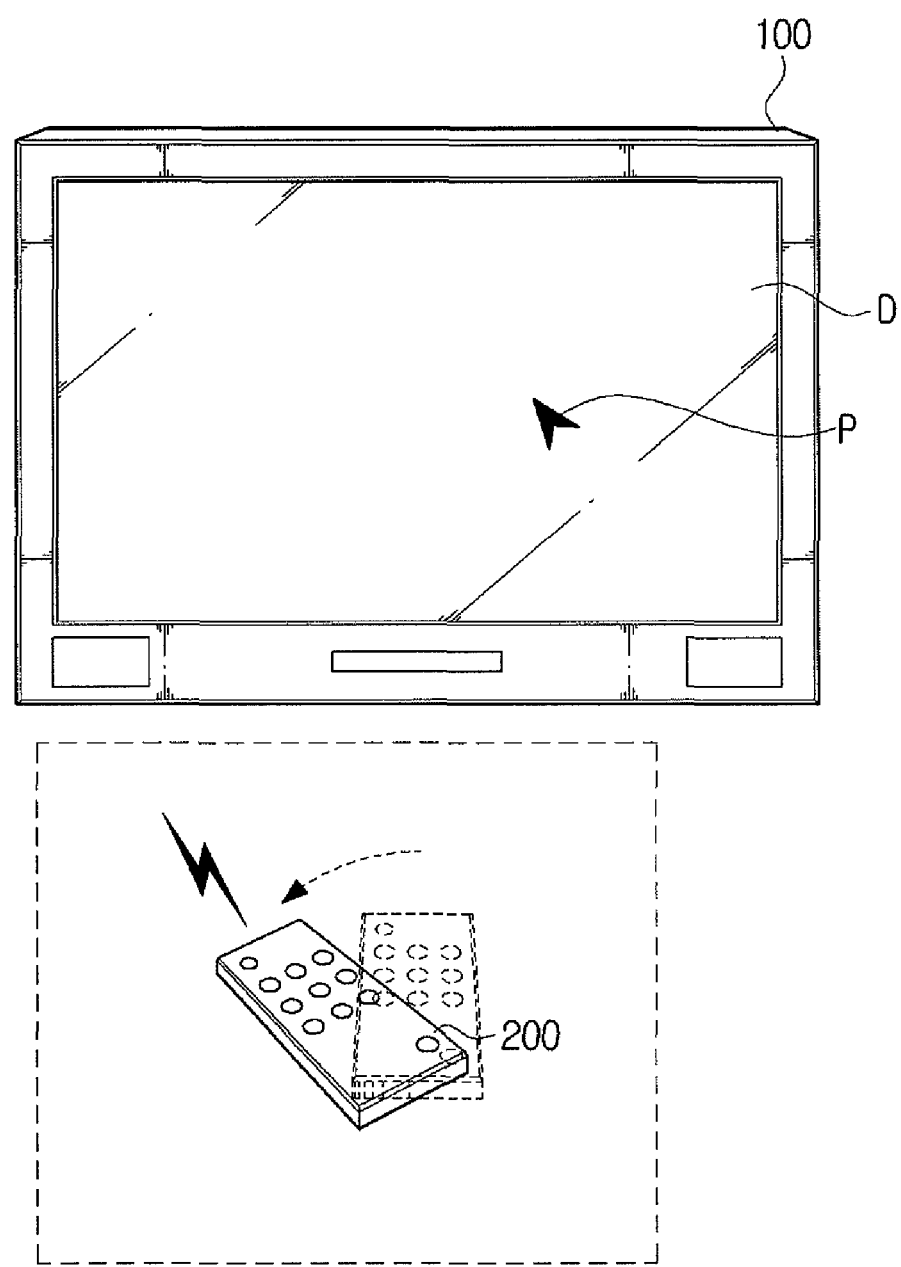

If only the user's wrist moves in an upwards or downwards direction, or to the left or right, or in a direction combining these, such as an upper leftward direction, the front end of the remote control 200 may be moved upwards, downwards, or to the left or right, or in a direction combining any of these movements, such as an upper leftwards direction while drawing a curved locus on a virtual hemisphere surface. FIG. 1C shows a situation in which the front end of the remote control 200 is moved to the left by a user while drawing a curved locus on a virtual hemisphere surface.

The virtual hemisphere surface, on which the front end of the remote control 200 is moved by rotation of the user's wrist, may be a mathematically imperfect hemisphere surface. That is, it is practically impossible for the front end of the remote control 200 to be moved by rotating the user's wrist while drawing a locus on a mathematically perfect hemisphere surface.

Accordingly, the present invention may be applicable to a situation in which the front end of the remote control 200 does not move on a mathematically perfect hemisphere, but moves on an imperfect hemisphere surface while drawing a curved locus.

Thus, a pointer P displayed on the display D may be moved by the user spatially moving the remote control 200. The spatial movement of the front end of the remote control 200 is distinguished from the movement of a mouse for a personal computer (PC), which moves over a surface.

When the front end of the remote control 200 is moved within a space, the pointer P displayed on the display D moves in the same direction as the front end of the remote control 200. For example, if a user moves the front end of the remote control 200 upwards within a space, then the pointer P may move upwards, and if the user moves the front end of the remote control 200 to the upper-left within a space, then the pointer P may move to the upper-left.

Figure 2:
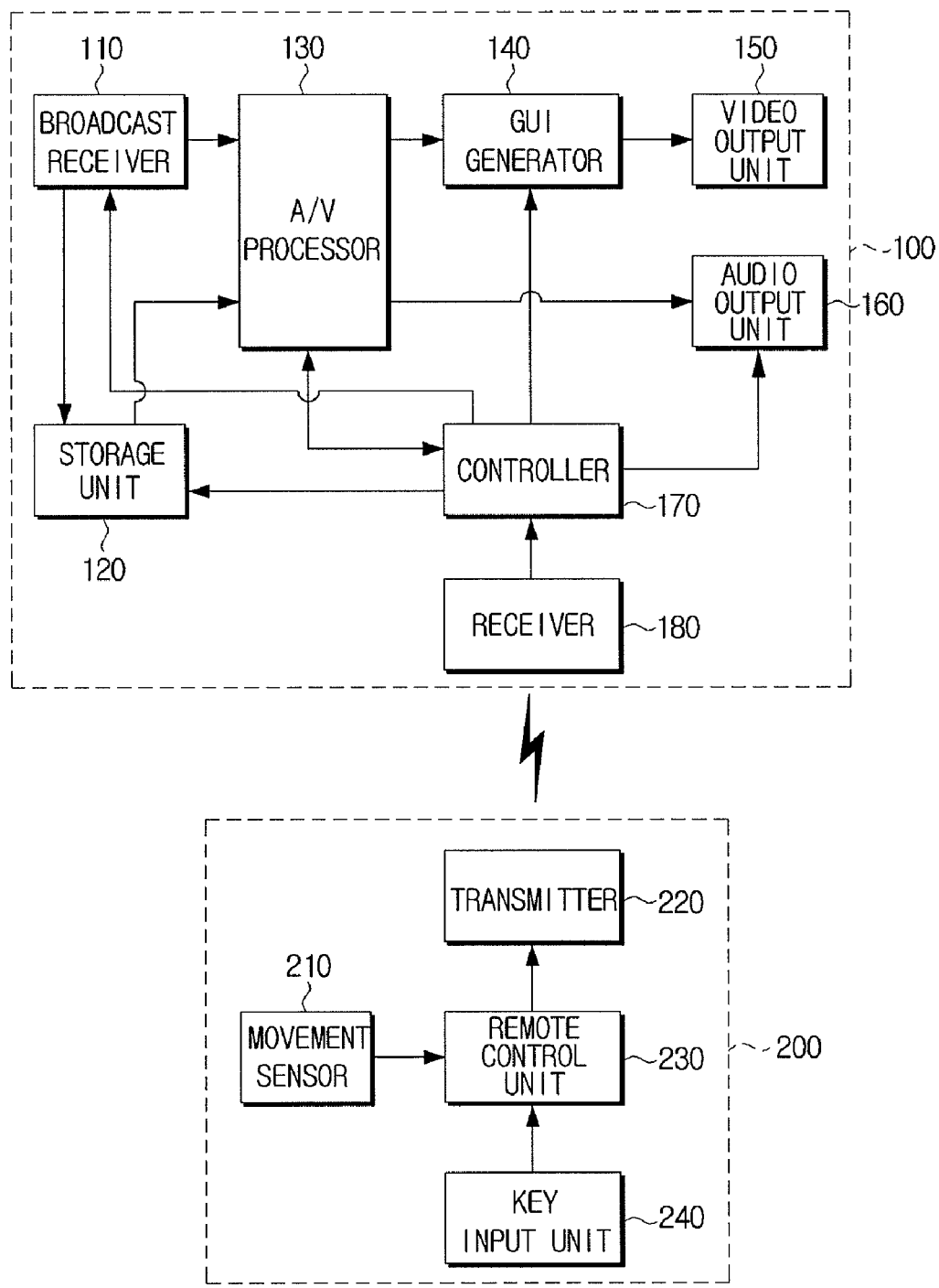
FIG. 2 is a detailed block diagram showing a DTV and a remote controller of FIGS. 1A-1C, according to an exemplary embodiment of the present invention.

Hereinafter, the DTV 100 and the remote control 200 illustrated in FIGS. 1A-1C will be described in detail with reference to FIG. 2. FIG. 2 is a block diagram of the DTV 100 and the remote control 200 of FIGS. 1A-1C.

Referring to FIG. 2, the remote control 200 comprises a movement sensor 210, a transmitter 220, a remote control unit 230, and a key input unit 240.

The movement sensor 210 senses the movement of the front end of the remote control 200, and sends the result of sensing to the remote control unit 230 which will be described in detail below. The movement sensor 210 may be implemented by a biaxial gyro sensor and a biaxial acceleration sensor.

The key input unit 240 may comprise a power key, a channel key, a volume key, a selection key, or other keys.

The remote control unit 230 transmits information regarding movement such as a direction of movement, a distance moved, or other information, which is obtained from the sensing result transmitted from the movement sensor 210, to the DTV 100 via the transmitter 220. The remote control unit 230 also sends information about keys input by the user using the key input unit 240 to the DTV 100 through the transmitter 220.

Referring to FIG. 2, the DTV 100 comprises a broadcast receiver 110, a storage unit 120, an A/V processor 130, a graphical user interface (GUI) generator 140, a video output unit 150, an audio output unit 160, a controller 170 and a receiver 180.

The broadcast receiver 110 receives a broadcast via a wired or wireless connection from a broadcasting station or a satellite, and demodulates the received broadcast.

The storage unit 120 stores a broadcast, which is output from the broadcast receiver 110. The storage unit 120 may play back the broadcast stored therein.

The A/V processor 130 performs signal processing such as video decoding, video scaling, and audio decoding of the broadcast output from the broadcast receiver 110. The A/V processor 130 also performs such signal processing with respect to the broadcast played back by the storage unit 120. Additionally, the A/V processor 130 transmits the video signal to the GUI generator 140, and the audio signal to the audio output unit 160, respectively.

The A/V processor 130 separates additional data from the broadcast, and transfers the separated additional data to the controller 170. The additional data may be program and system information protocol (PSIP) information. The PSIP information may comprise electronic program guide (EPG) information.

The GUI generator 140 generates a GUI to be displayed on the display D, and combines the GUI with the video output from the A/V processor 130. The GUI generator 140 generates a GUI corresponding to a control command received from the controller 170.

The video output unit 150 may display the video combining the GUI output from the GUI generator 140 on the display D, or may output it to an external apparatus such as an external DTV connected through an external output terminal (not shown).

The audio output unit 160 may output the audio output from the A/V processor 130 via a speaker, or may output the audio to an external apparatus connected through an external output terminal (not shown).

The controller 170 controls the entire operation of the DTV 100 according to information regarding the operation, provided by the user, comprising movement of the front end of the remote control 200, or a key input, which is received from the remote control 200 by the receiver 180. Specifically, the controller 170 may control a tuning operation of the broadcast receiver 110, a GUI generating operation of the GUI generator 140, or other operations of the DTV 100.

Figure 3:
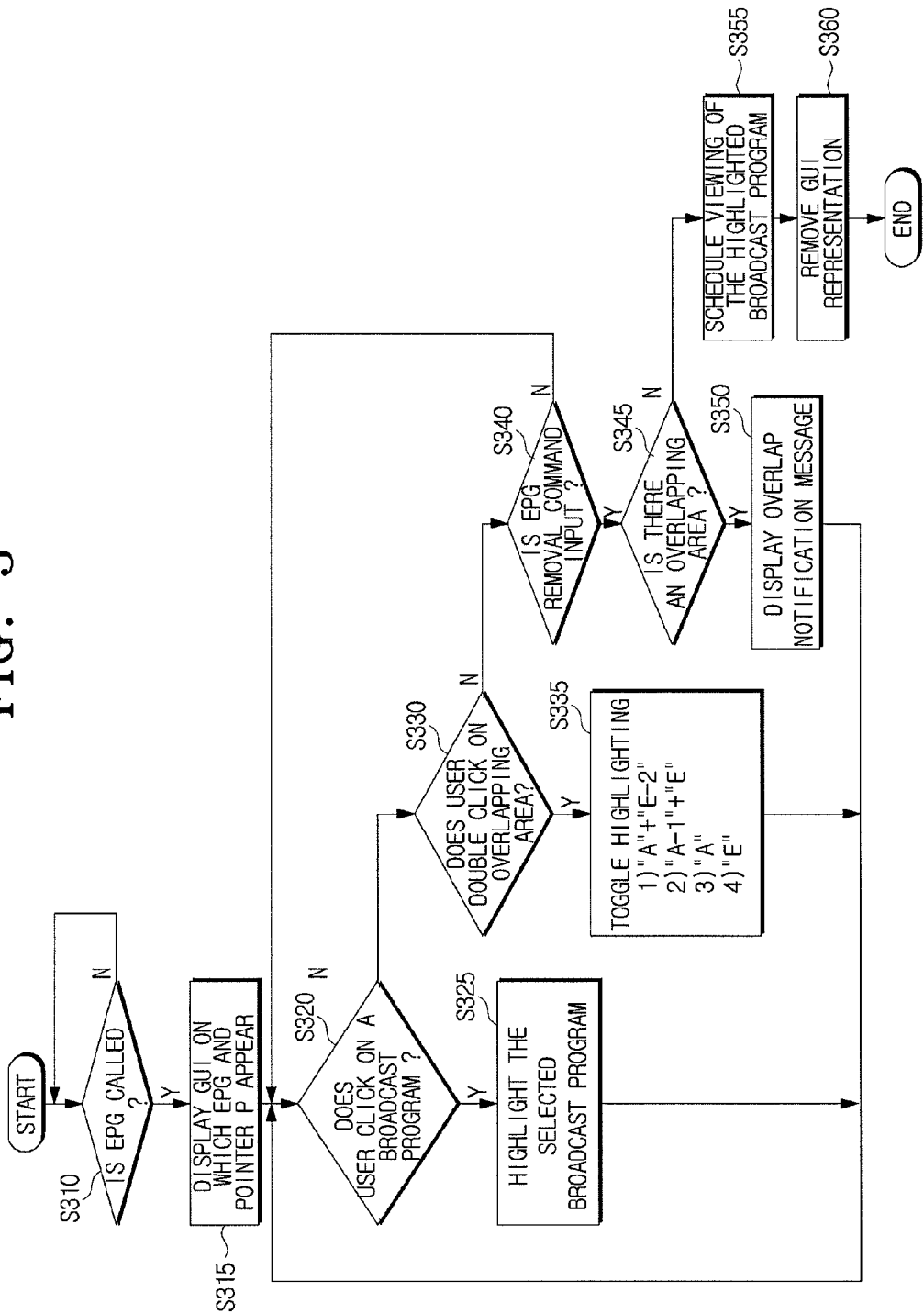
FIG. 3 is a flowchart explaining a method for providing a GUI for selecting a broadcast program, according to an exemplary embodiment of the present invention.

The controller 170 controls the GUI generator 140 to provide a GUI showing an EPG that may be manipulated by a user using the pointer P, and also controls the broadcast receiver 110 to schedule viewing of broadcast programs selected by a user using the GUI. Such a controlling operation of the controller 170 will be described in detail below with reference to FIG. 3. FIG. 3 is a flowchart explaining a method for providing a GUI for selecting a broadcast program, according to an exemplary embodiment of the present invention.

In FIG. 3, if a user wishes to view an EPG (S310-Y), the controller 170 may control such that a GUI on which the EPG and pointer P appear may be displayed on the display D (S315).

In operation S310, the user may open the EPG by pressing the channel key on the key input unit 240 of the remote controller 200, or by using other methods.

To execute operation S315, the controller 170 controls the GUI generator 140 to generate an EPG and a pointer P and to combine the generated EPG and pointer P with a broadcast to be displayed on the display D. Here, the EPG information, which is separated from the broadcast by the A/V processor 130 and transmitted to the controller 170, may be used to generate an EPG.

Figure 4A:
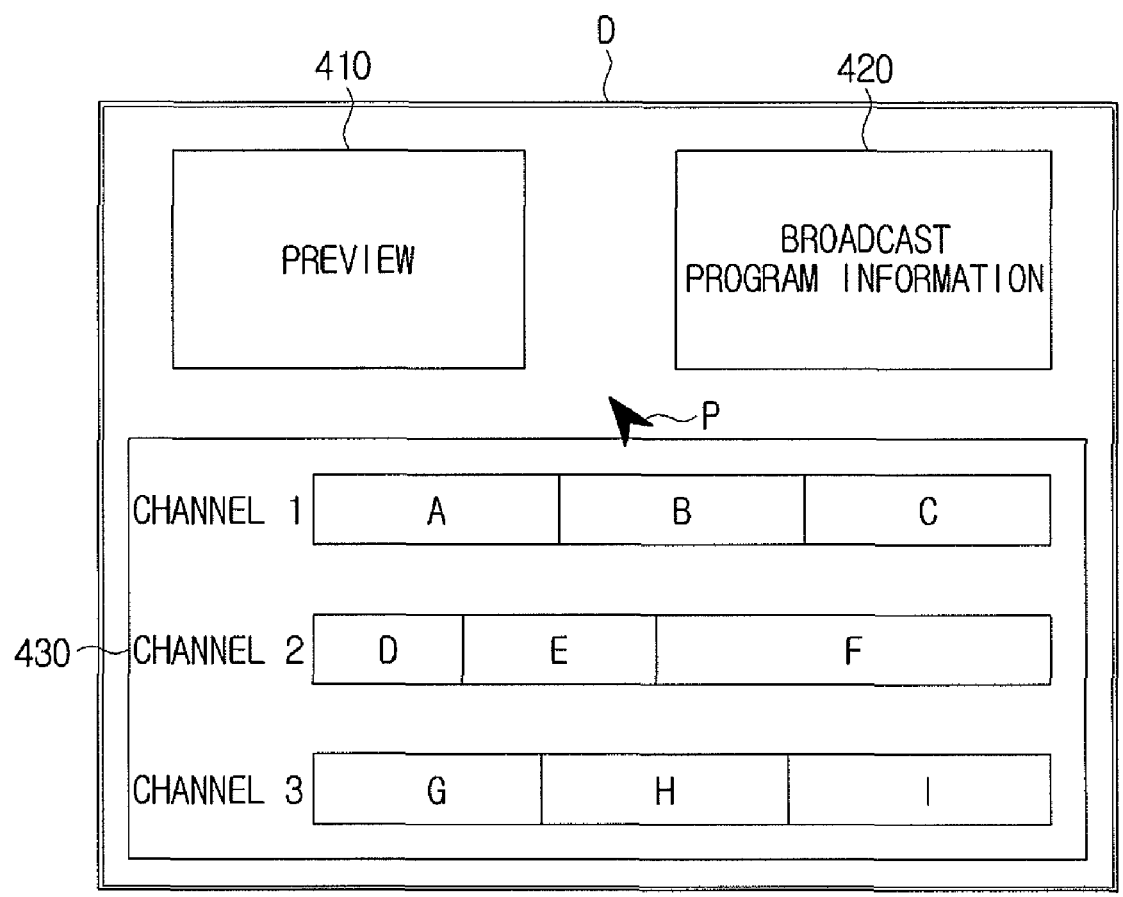
FIGS. 4A to 4H are views explaining in detail the method for providing a GUI shown in FIG. 3, according to an exemplary embodiment of the present invention.

FIG. 4A illustrates an example of the display D showing the EPG 430 and pointer P after operation S315 is performed.

In FIG. 4A, a preview window 410 and a broadcast program information window 420 are displayed on the top of the EPG 430.

The preview window 410 shows a broadcast screen of the broadcast program selected using the pointer P from among the broadcast programs displayed on the EPG 430, and the broadcast program information window 420 shows detailed information regarding the broadcast program displayed on the preview window 410, for example the broadcast title, broadcast time, broadcast image quality, screen ratio, cast listing or the like.

The EPG 430 is a guide screen on which graphics having rectangular shapes "A", "B", "C", "D", "E", "F", "G", "H" and "I" are displayed, which respectively represent broadcast programs "A", "B", "C", "D", "E", "F", "G", "H" and "I".

If a user clicks on a predetermined broadcast program on the EPG 430 appearing in operation S315 using the pointer P (S320-Y), the controller 170 may control the GUI generator 140 so that the selected broadcast program is highlighted (S325).

To be exact, during operation S320, the user does not click on the predetermined broadcast program, but on the graphic indicating the predetermined broadcast program, using the pointer P. However, for convenience of description and illustration, the predetermined broadcast program is described here as being clicked on using the pointer P.

Operation S320 may be executed by pressing the selection key on the key input unit 240 of the remote controller 200, when the front end of the remote control 200 is moved spatially by the user and the pointer P is thus moved to indicate the predetermined broadcast program.

Figure 4B:
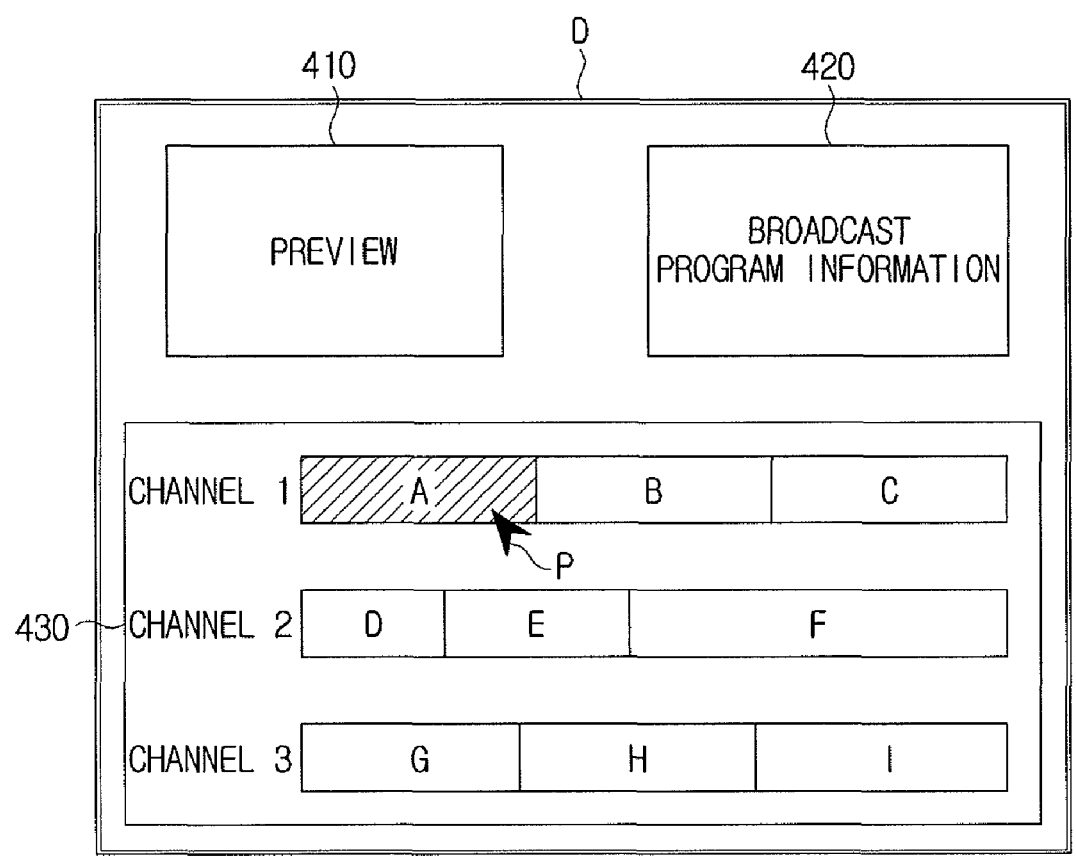
Figure 4C:
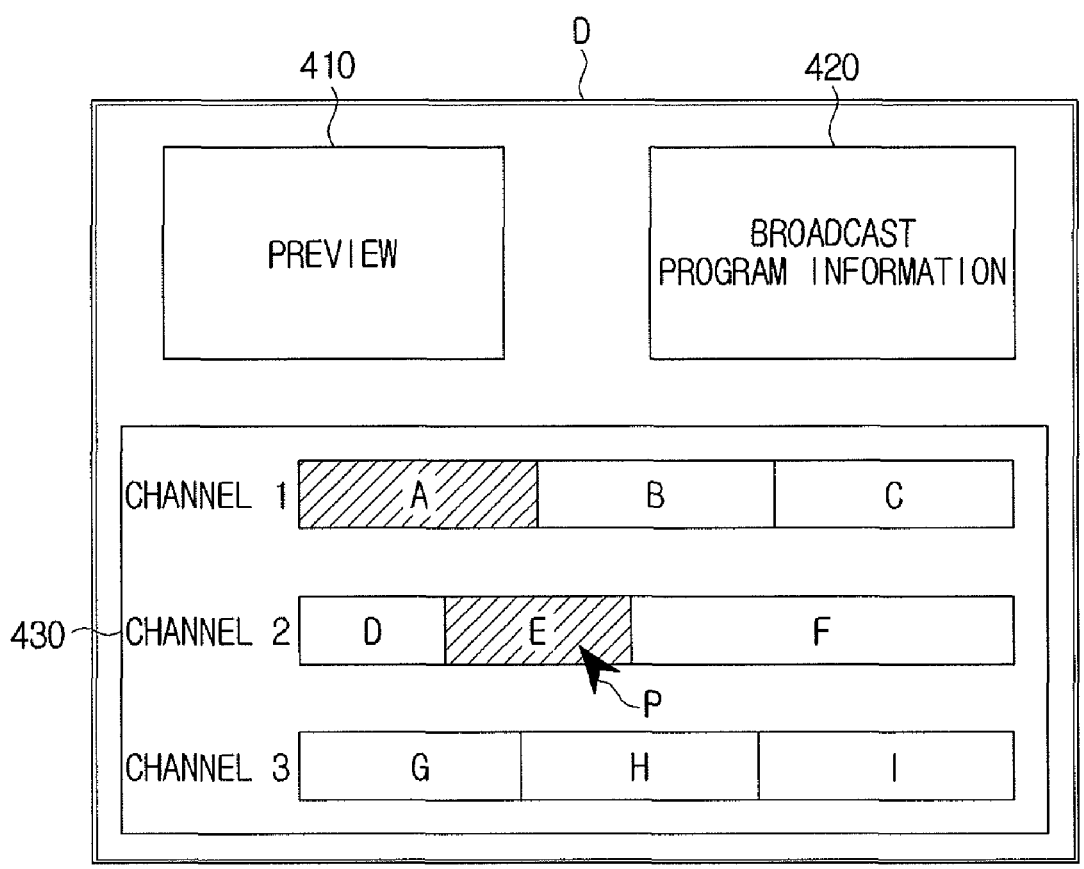

FIG. 4B illustrates an example of the display D after the broadcast program "A" has been clicked on using the pointer P and highlighted, and FIG. 4C illustrates an example of the display D after the broadcast program "E" has been clicked on using the pointer P and highlighted.

If a user double clicks on an area of the EPG 430 where the broadcast time slots of the highlighted broadcast programs overlap (hereinafter, referred to as an overlapping area) (S330-Y), the controller 170 may toggle between highlighting and un-highlighting the broadcast programs according to how many times the broadcast programs are double clicked (S335).

Figure 4D:
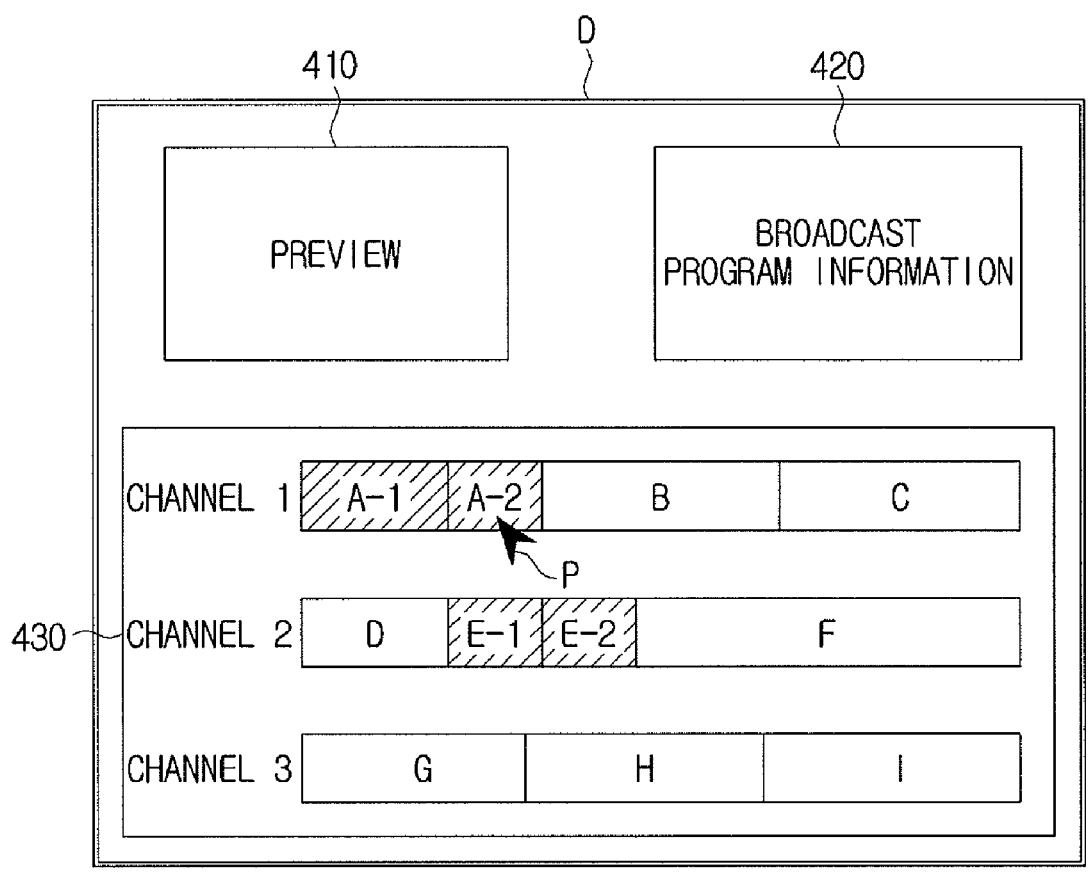

For example, as shown in FIG. 4D, when broadcast programs "A" and "E" are highlighted, "A-2" and "E-1" overlap. To execute operation S330, the user may press twice quickly the selection key on the key input unit 240 of the remote controller 200 when the pointer P indicates "A-2" or "E-1" by spatially moving the front end of the remote controller 200. FIG. 4D illustrates an example of the display D displayed when "A-2" is double clicked.

In operation S335, the toggling between highlighting and un-highlighting the broadcast programs may be performed according to how many times the broadcast programs are double clicked. In this situation, the broadcast programs may be toggled in a sequence of "A"+"E-2", "A-1"+"E", "A" and "E".

Figure 4E:
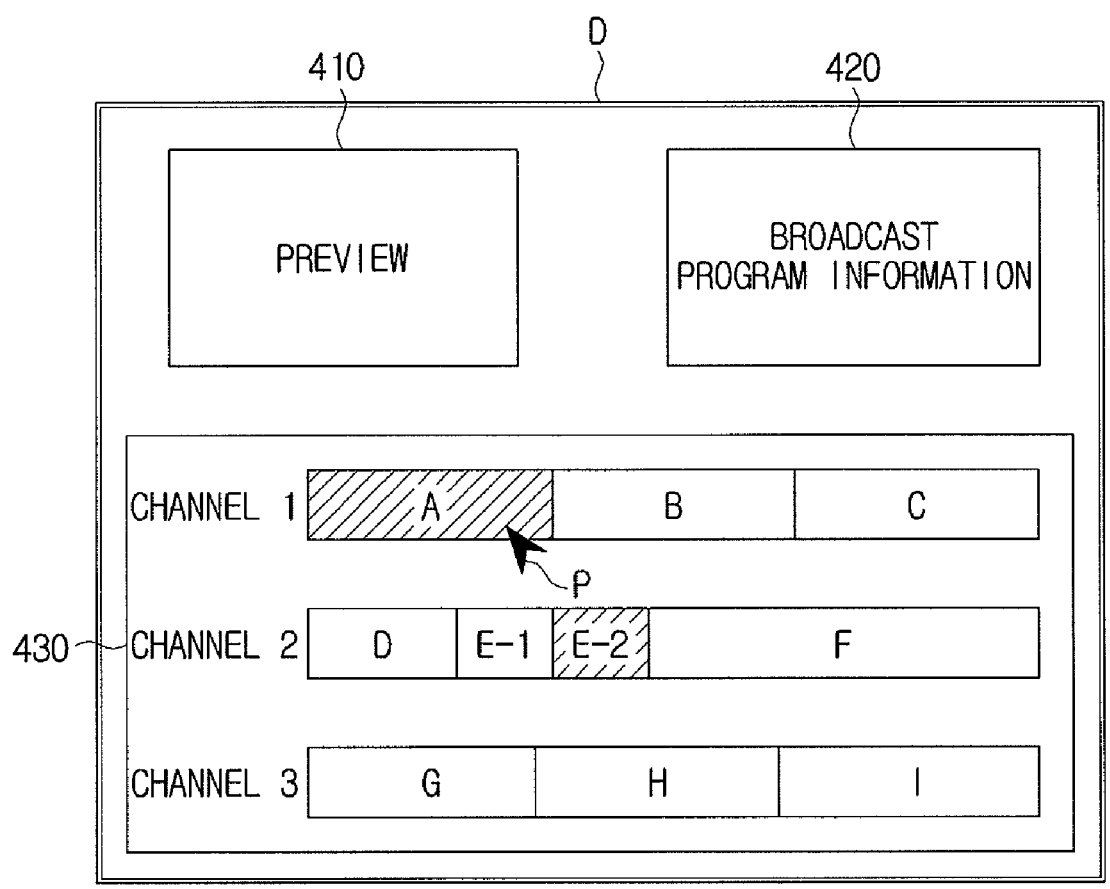
Figure 4F:
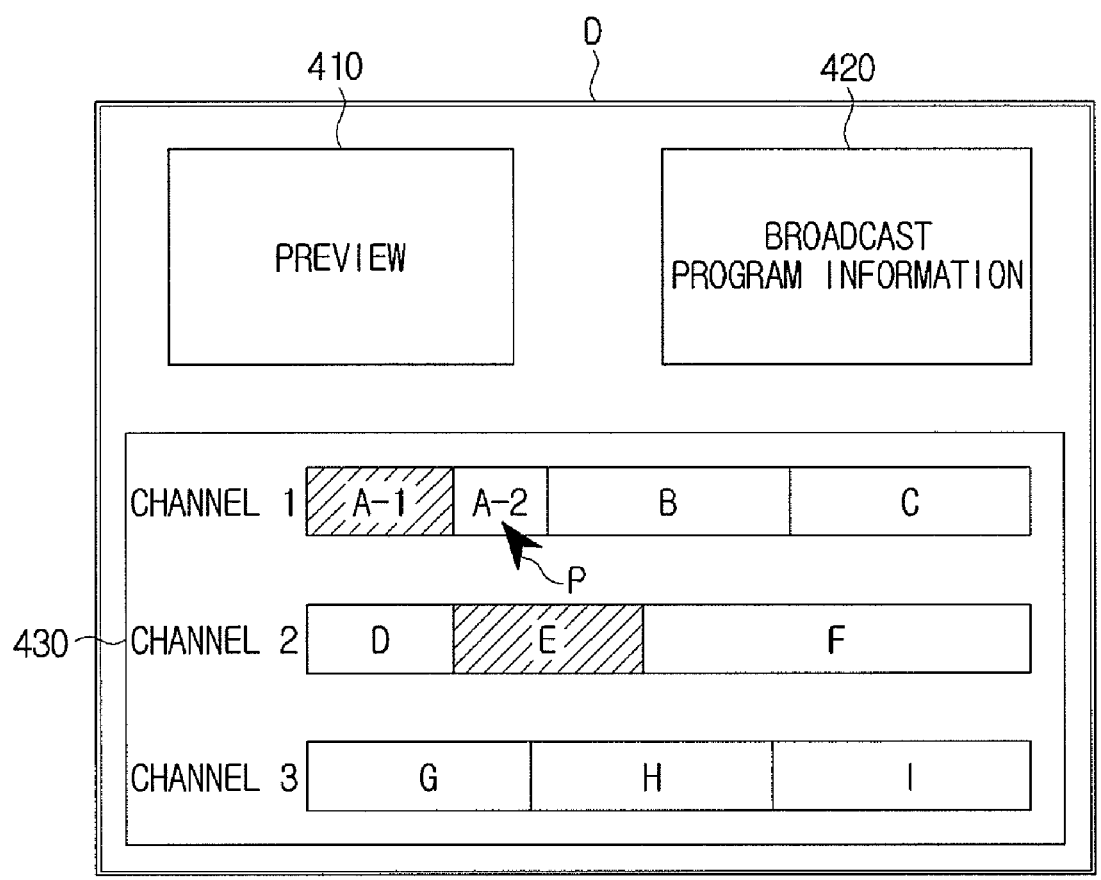
Figure 4G:
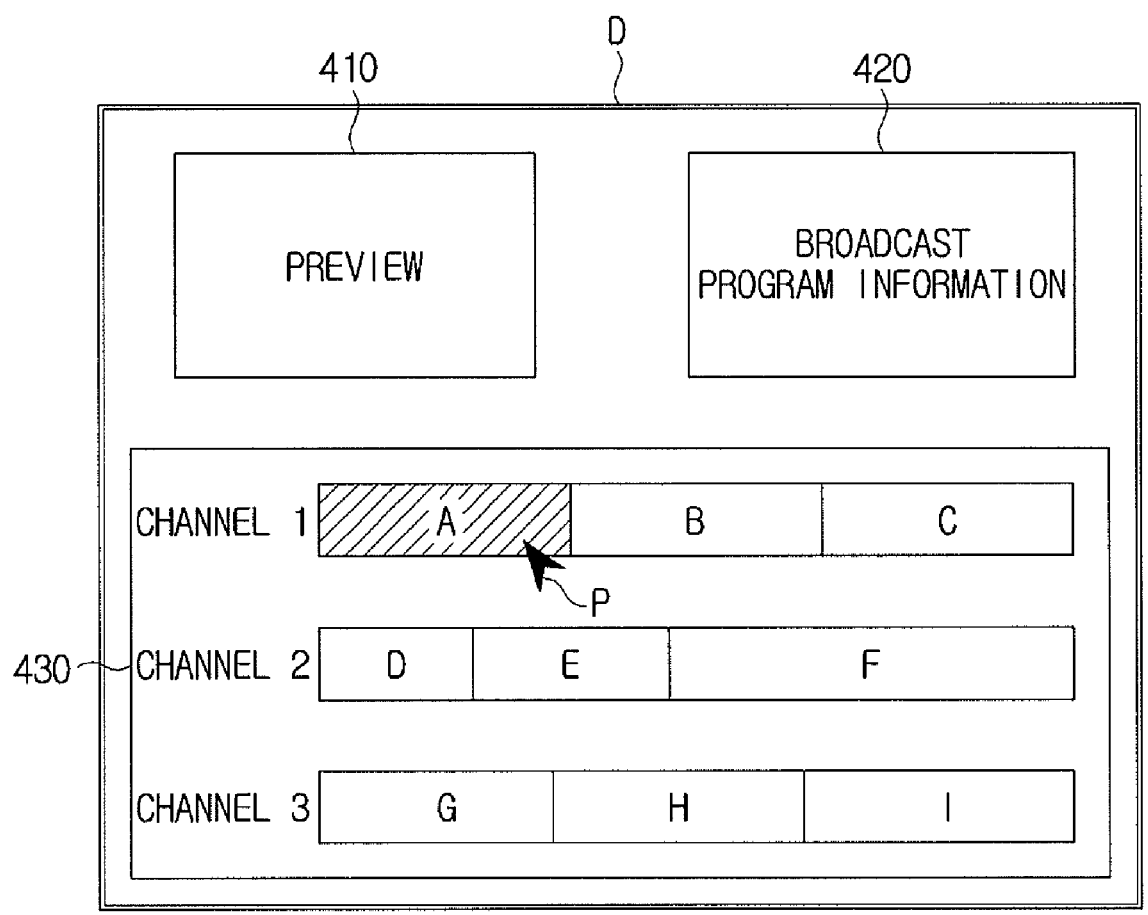
Figure 4H:
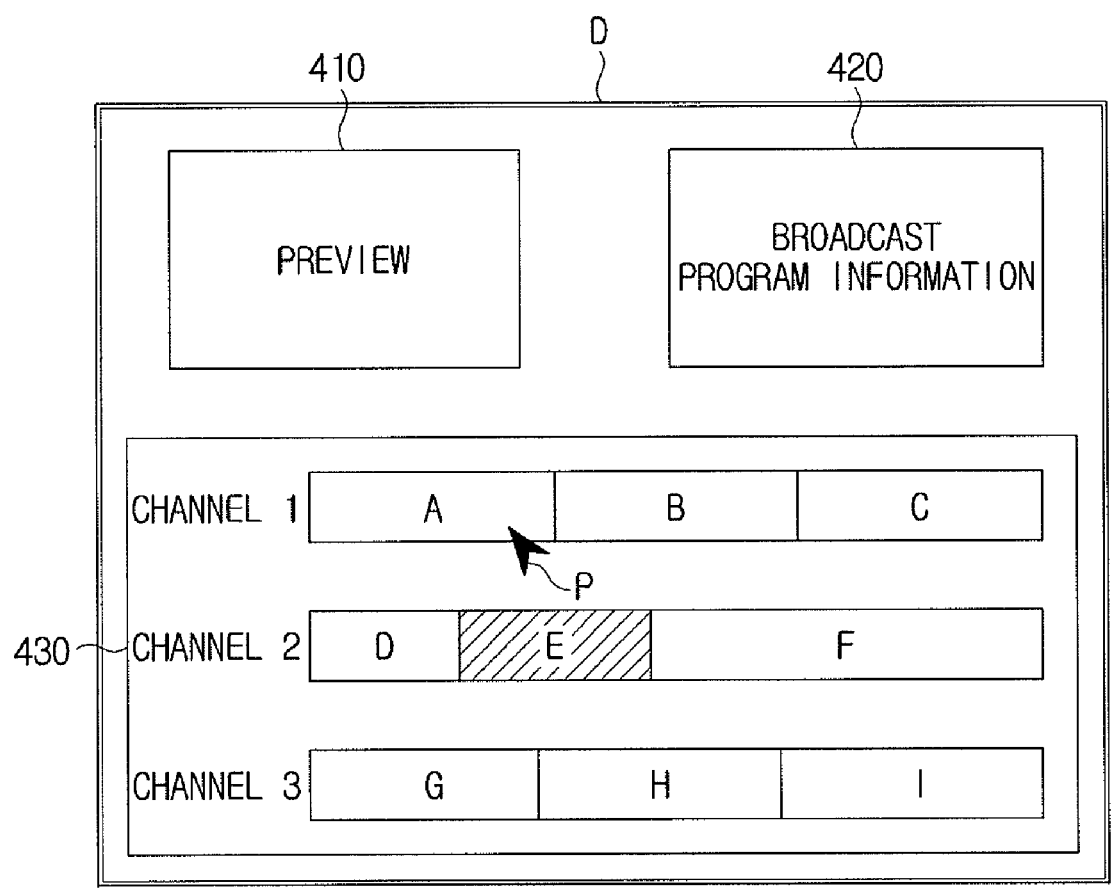

In more detail, if "A-2" or "E-1" is double clicked, "A" and "E-2" may be highlighted as shown in FIG. 4E, and if "A-2" or "E-1" is double clicked a second time, "A-1" and "E" may be highlighted as shown in FIG. 4F. Additionally, if "A-2" or "E-1" is double clicked a third time, "A" may be highlighted as shown in FIG. 4G, and if "A-2" or "E-1" is double clicked a fourth time, "E" may be highlighted as shown in FIG. 4H. After double clicking has been performed four times, "A" and "E-2" may be highlighted again as shown in FIG. 4E.

If the user inputs an EPG removal command (S340-Y), the controller 170 may determine whether there is an overlapping area on the EPG 430 (S345).

In operation S340, the user may input the EPG removal command by pressing the channel key on the key input unit 240 again, or by using other methods.

The overlapping area on the EPG 430 means that the broadcast time slots of the highlighted broadcast programs overlap. For example, the EPG 430 of FIG. 4C comprises the overlapping area, but overlapping areas do not exist on the EPG 430 shown in FIGS. 4E to 4H.

If it is determined that there is an overlapping area on the EPG 430 (S345-Y), the controller 170 may control the GUI generator 140 to generate an overlap notification message and to combine the generated message to a broadcast to be displayed on the display D (S350).

The overlap notification message may be used to notify that there is an overlapping area on the EPG 430 so it is impossible to schedule viewing in a normal manner. Additionally, a user comment requesting that the overlapping area be removed may be added to the overlap notification message. Furthermore, in operation S350, not only the overlap notification message may be displayed, but also colors of the overlapping area may be changed so that the user may easily recognize the overlapping area on the EPG 430.

If it is determined that there is no overlapping area on the EPG 430 (S345-N), the controller 170 may schedule viewing of the broadcast program highlighted on the EPG 430 (S355).

In this situation, several broadcast programs may be highlighted, so several broadcast programs may be scheduled for viewing. Additionally, only one portion of the broadcast program may be highlighted, and thus the portion of the broadcast program may be scheduled for viewing in operation S355.

In order to perform operation S355, the controller 170 may control the tuning of the broadcast receiver 110, so that the user may view the video as soon as the broadcast of the scheduled broadcast program begins.

The controller 170 may then control the GUI generator 140 so that the GUI showing the EPG 430 and pointer P that has been displayed from operation S315 may disappear from the display D (S360).

Figure 5:
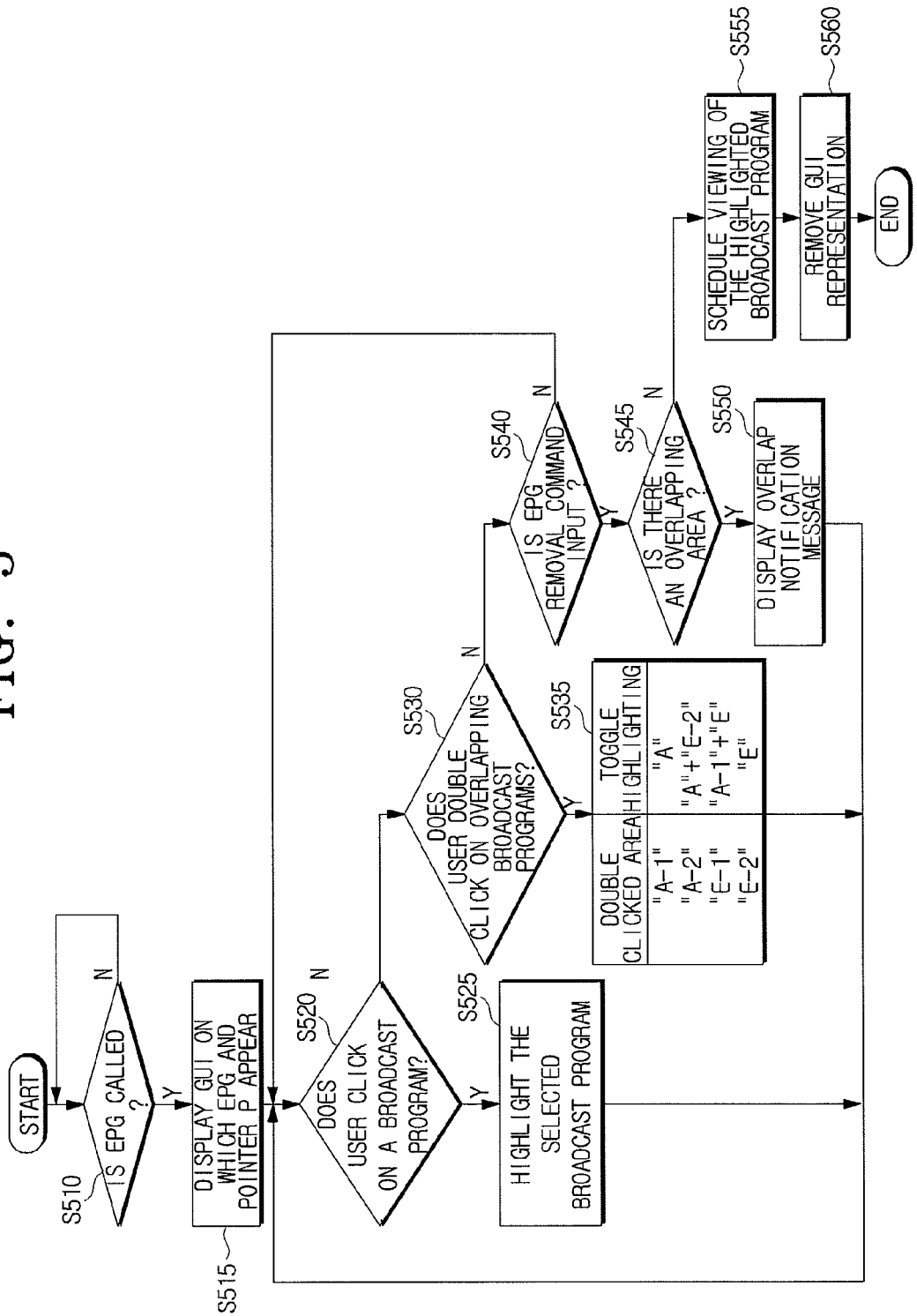
FIG. 5 is a flowchart explaining a method for providing a GUI for selecting a broadcast program, according to another exemplary embodiment of the present invention.

Hereinafter, another exemplary embodiment of the present invention will be described in detail with reference to FIG. 5. FIG. 5 is a flowchart explaining a method for providing a GUI for selecting a broadcast program, according to the another exemplary embodiment of the present invention.

Operations S510 to S525 and S540 to S560 shown in FIG. 5 may be performed in the same manner as operations S310 to S325 and S340 to S360 shown in FIG. 3, respectively. Therefore, description of operations S510 to S525 and S540 to S560 is omitted herein, and only operations S530 and S535 will be described in detail below.

As shown in FIG. 5, if a user double clicks on the highlighted broadcast programs to be broadcast in the same time slot (hereinafter, referred to as overlapping broadcast programs) in the EPG 430 (S530-Y), the controller 170 may toggle between highlighting and unhighlighting the broadcast programs according to which portion of the overlapping broadcast programs is double clicked (S535).

Figure 6A:
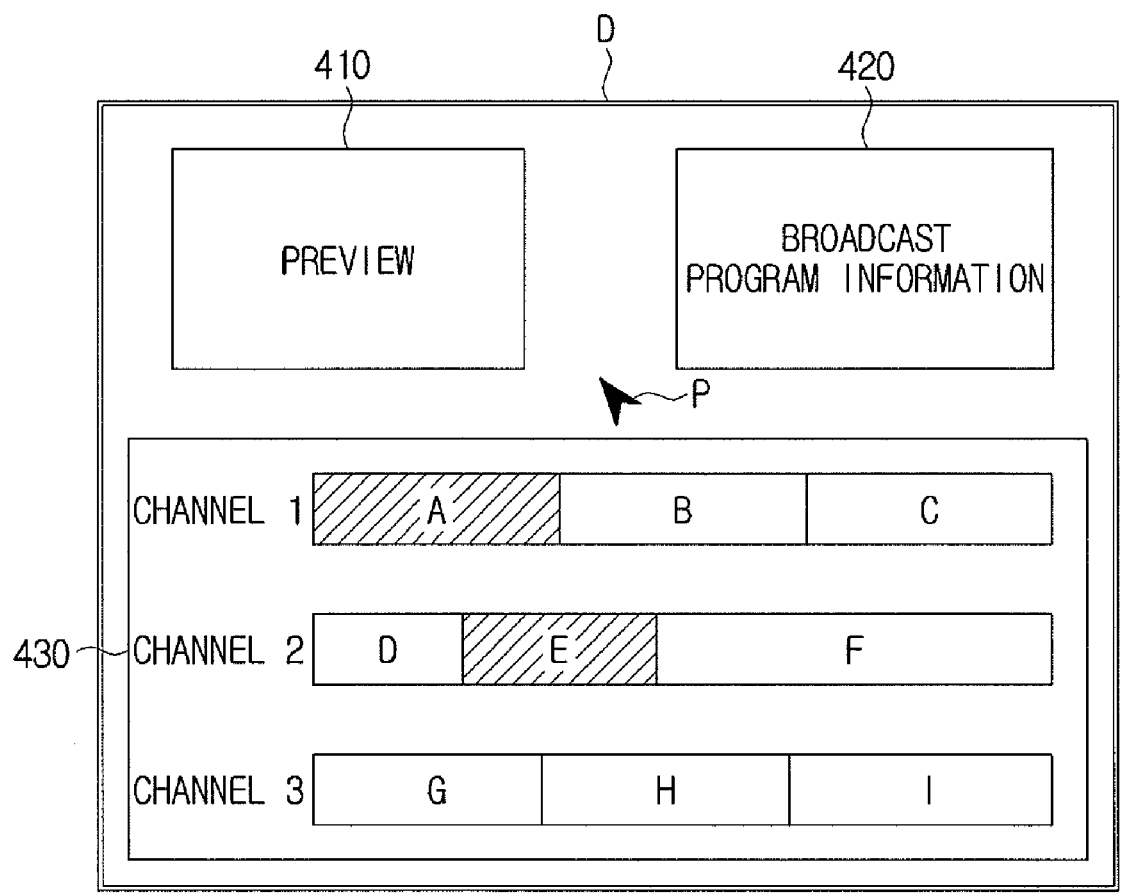
FIGS. 6A to 6E are views explaining in detail the method for providing a GUI shown in FIG. 5, according to an exemplary embodiment of the present invention.

For example, as shown in FIG. 6A, when broadcast programs "A" and "E" are highlighted, "A" and "E" are referred to as overlapping broadcast programs. This is because both the broadcast programs "A" and "E" are highlighted and the broadcast time slots of each partially overlap.

Figure 6B:
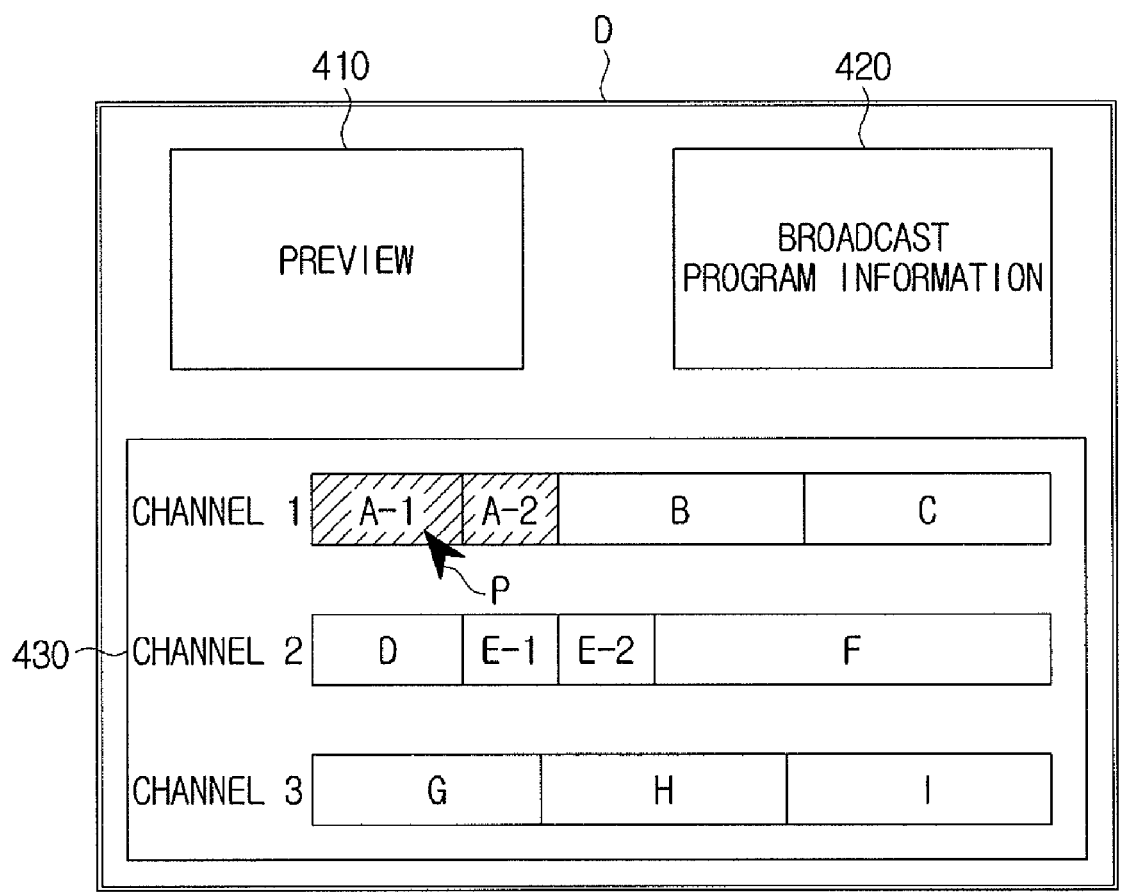
Figure 6C:
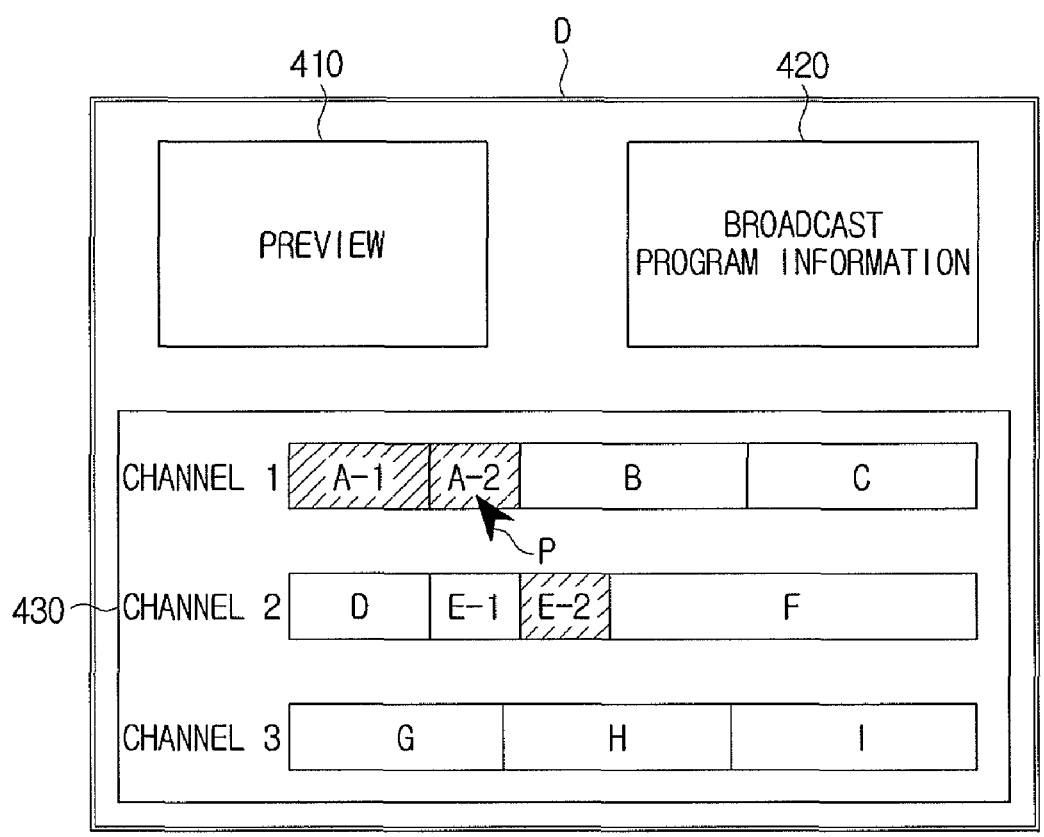
Figure 6D:
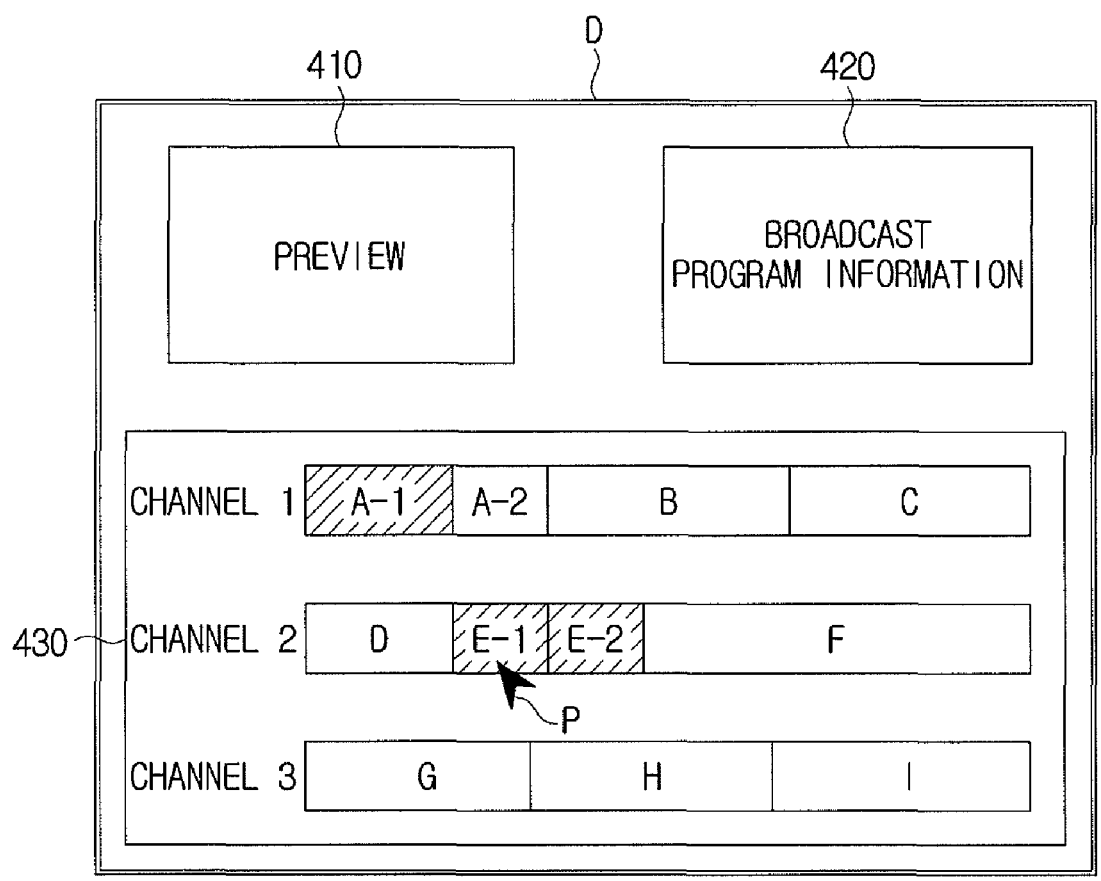
Figure 6E:
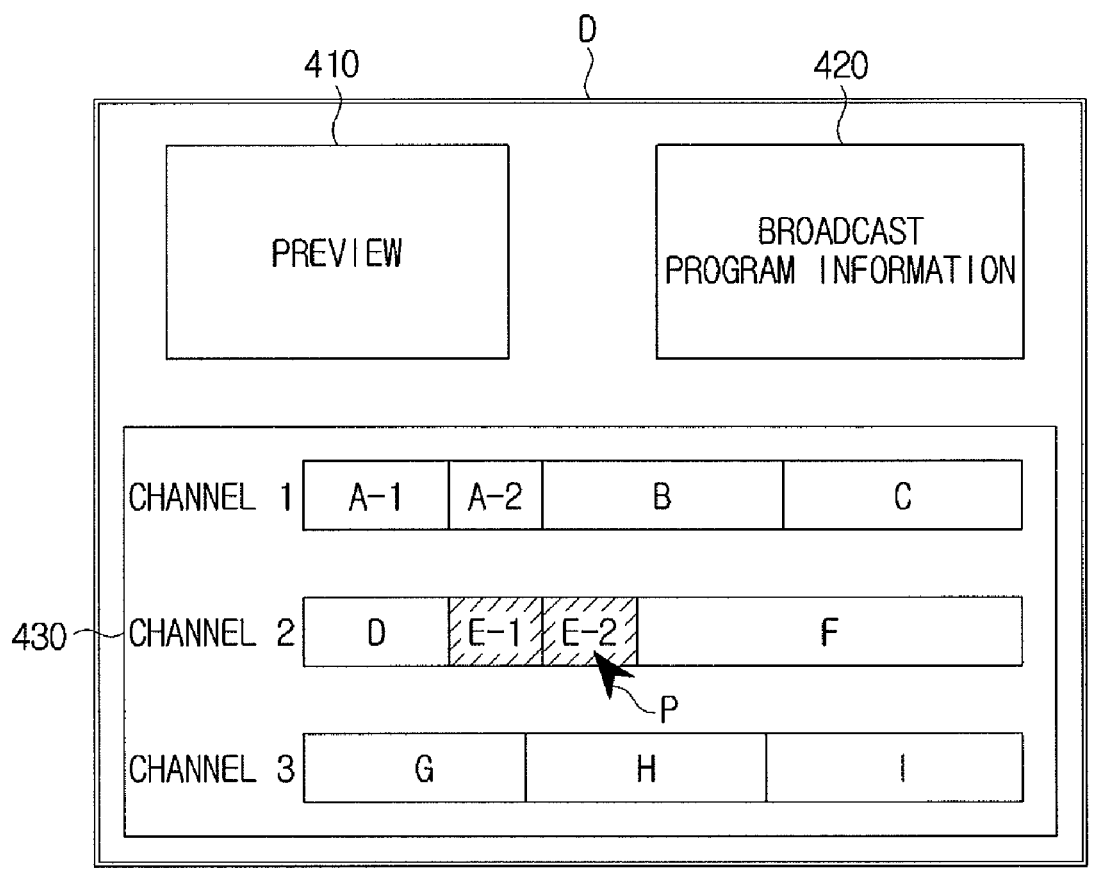

The toggling between highlighting and unhighlighting the broadcast programs may be performed according to which portion of the overlapping broadcast programs is double clicked at operation S535. Specifically, if "A-1" is double clicked, "A", namely "A-1" and "A-2", may be highlighted, as shown in FIG. 6B; if "A-2" is double clicked, "A" and "E-2" may be highlighted, as shown in FIG. 6C; if "E-1" is double clicked, "A-1" and "E", namely "E-1" and "E-2", may be highlighted, as shown in FIG. 6D; and if "E-2" is double clicked, "E" may be highlighted, as shown in FIG. 6E.

Detailed description of exemplary embodiments of the present invention are given above of the process of scheduling viewing of the broadcast programs through the GUI showing the EPG that can be operated by the user using the pointer P, and the process of scheduling viewing when the broadcast programs are in the same time slot.

Although exemplary embodiments described above have described the DTV as an example of the broadcast receiving apparatus, the broadcast receiving apparatus may also be a set top box (STB), a digital multimedia broadcast (DMB) receiving apparatus, and a portable apparatus with a built-in module for receiving a broadcast, such as a mobile phone, a personal multimedia player (PMP) and a navigation apparatus with a built-in module for receiving a DMB.

According to exemplary embodiments described above, the pointer P may be moved by the user spatially moving the remote controller. However, the present invention may be applied to a situation in which the pointer P may be moved using a direction input means such as direction keys on a remote controller, or with a joystick or touch pad instead of a remote control.

Additionally, the present invention is also applicable to a situation in which an input means, such as an input means included in the main body may be used to move the pointer P instead of the remote controller. In the case of a general portable device, it is useful to move the pointer without using the remote controller.

The pointer is used to select a specific broadcast program, overlapping area and overlapping broadcast programs in the exemplary embodiments described above, but other means such as a cursor may be used instead of the pointer.

The pointer and EPG of the GUI may be implemented in forms different from the form illustrated in FIGS. 6A-6E. Additionally, the preview window and broadcast program information window may also be illustrated differently from the form shown in FIGS. 4A-4H, or may be omitted.

According to exemplary embodiments described above, if the overlapping area and/or the overlapping broadcast programs is double clicked, toggling between highlighting and unhighlighting the broadcast programs may be performed. However, the present invention is applicable to a situation in which the user selects the overlapping area and/or the overlapping broadcast programs using other input processes, instead of double clicking.

If the broadcast time slots of the highlighted broadcast programs overlap according to exemplary embodiments described above, broadcast time slots of broadcast programs selected to be scheduled for viewing may at least partially overlap. However, this situation corresponds to a situation in which broadcast programs a user wishes to view cannot be simultaneously selected. Accordingly, the present invention may be applied to a situation in which the user is unable to select all the desired broadcast programs due to reasons other than the overlapping time slots.

In addition, according to exemplary embodiments described above, information regarding operation by the user, such as double clicking, may be input in the area which displays the graphics representing the broadcast programs that cannot be simultaneously selected, that is, in the overlapping area and the graphics indicating the overlapping broadcast programs. However, the information regarding operation by the user may also be input in areas other than the above area.

Furthermore, consistent with the present invention, only one broadcast program, or one broadcast program and a portion of another broadcast program, may be selected from among the broadcast programs that cannot be simultaneously selected, according to the user operation. However, the present invention may also be applied to other user selections which are associated with the broadcast programs that cannot be simultaneously selected.

Moreover, a schedule for viewing the broadcast programs selected by the user is set using the EPG in the exemplary embodiments described above for convenience of description. Accordingly, a schedule for recording the broadcast programs selected by the user may also be set using the EPG.

Additionally, the present invention may also be applied to a guide in which broadcast programs are arranged and through which a user may select a portion of the arranged broadcast programs, instead of the EPG.

The broadcast programs cannot be simultaneously selected by the user in the exemplary embodiments described above, and items such as menus of a broadcast program or icons, also may not be simultaneously selected by the user. In this situation, the time required for executing the items overlap, so it is impossible to select the items simultaneously.

Yet another exemplary embodiment of the present invention will be described in detail with reference to FIGS. 7 and 9.

Figure 7:
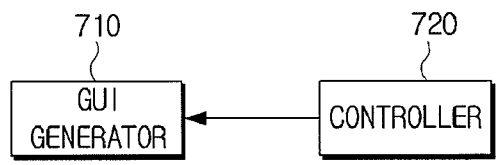
FIG. 7 is a block diagram showing an AV apparatus according to yet another exemplary embodiment of the present invention.

An AV apparatus of FIG. 7 comprises a GUI generator 710 and a controller 720.

The GUI generator 710 generates a GUI and combines the generated GUI with a video to be displayed. The controller 720 controls the GUI generator 710 to generate a GUI on which graphics representing broadcast programs appear. If information regarding operation by a user is input in an area containing graphics representing broadcast programs that cannot be simultaneously selected by the user, the AV apparatus may set a user selection regarding the broadcast programs that cannot be simultaneously selected, according to the input information.

Figure 8:
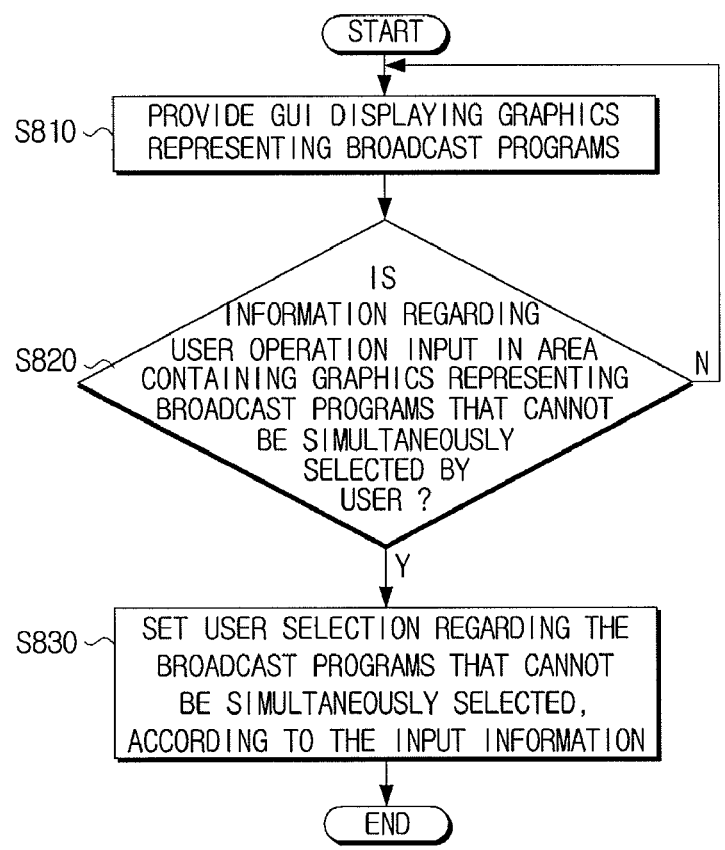
FIG. 8 is a flowchart explaining a method for providing a GUI according to yet another exemplary embodiment of the present invention.

According to a method for providing a GUI shown in FIG. 8, the AV apparatus provides the GUI on which graphics representing broadcast programs are displayed (S810). If information regarding operation by a user is input in an area containing the graphics representing the broadcast programs that cannot be simultaneously selected by the user (S820-Y), the AV apparatus may set a user selection regarding the broadcast programs that cannot be simultaneously selected, according to the input information (S830).

Figure 9:
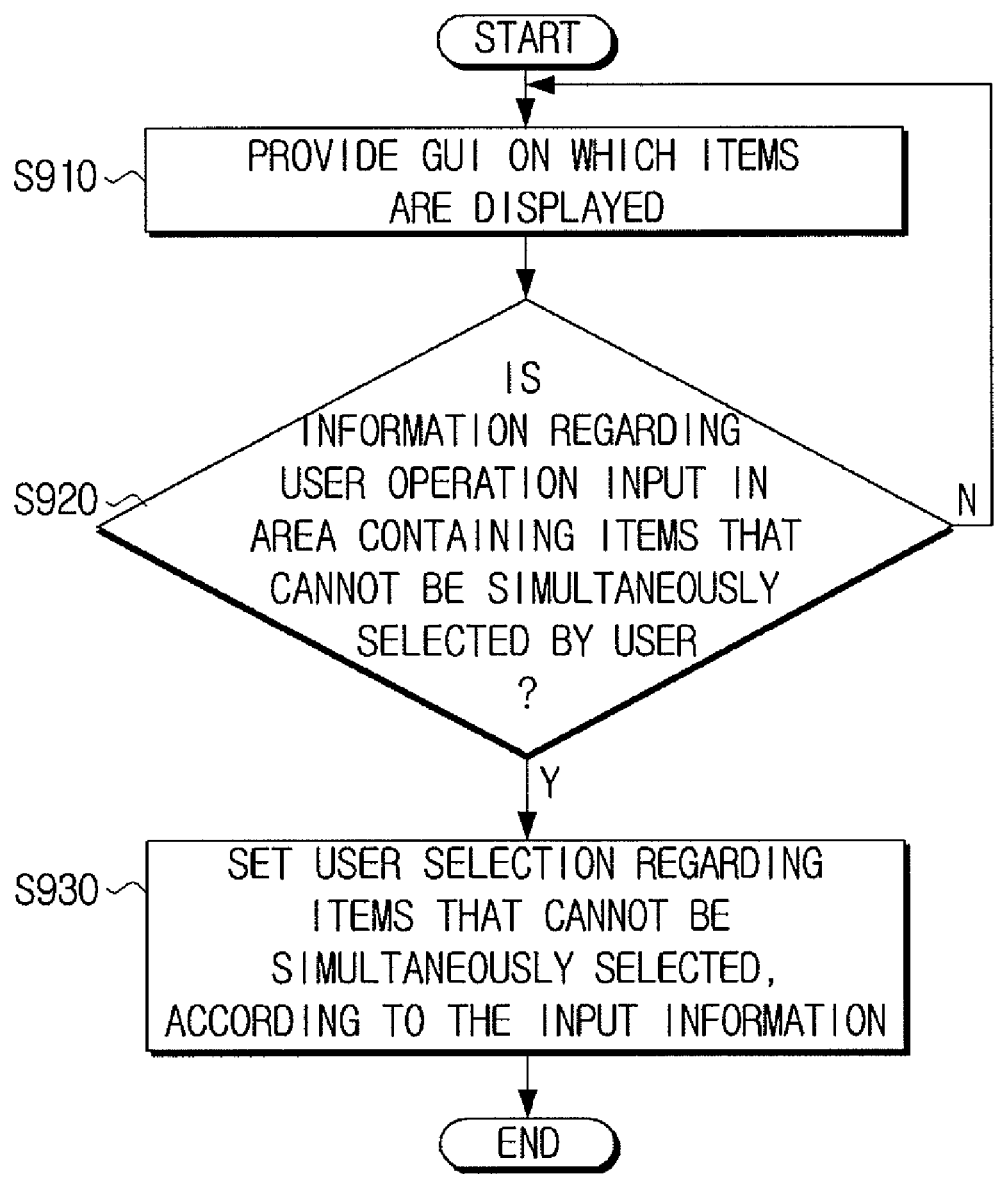
FIG. 9 is a flowchart explaining a method for providing a GUI according to yet another exemplary embodiment of the present invention.

According to a method for providing a GUI shown in FIG. 9, the AV apparatus provides a GUI on which items are displayed (S910). If information regarding operation by a user is input in an area containing items that cannot be simultaneously selected by the user (S920-Y), the AV apparatus may set a user selection regarding the items that cannot be simultaneously selected, according to the input information (S930).

According to the exemplary embodiments of the present invention described above, when a user makes errors in selecting broadcast programs, for example, when a user selects all broadcast programs that cannot be simultaneously selected, a GUI capable of correcting selection errors by the user more easily, instantly and intuitively may be provided to the user. Accordingly, user selection may be made more convenient.

Additionally, if a user erroneously selects items that cannot be simultaneously selected, it is possible to provide the user with a GUI capable of correcting selection errors by the user more easily, instantly and intuitively, so that user selection may be made more convenient.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for providing a graphical user interface (GUI), the method comprising:
    providing a GUI which displays graphics representing broadcast programs that cannot be simultaneously selected respectively;
    selecting graphics representing at least two of the broadcast programs having broadcast time which at least partially overlap so that the graphics are selected to be highlighted;
    displaying overlapping portion of one of the graphics highlighted to be unhighlighted when one of the graphics highlighted is selected according to a user operation; and
    performing scheduled recording of the broadcast program corresponding to the graphics highlighted,
    wherein the displaying highlights only the graphic selected when non-overlapping portion of one of the graphics highlighted is selected, and highlights the graphic selected and non-overlapping portion of another graphic which is not selected when overlapping portion of one of the graphics highlighted is selected.

2. The method as claimed in claim 1, wherein the GUI comprises an electronic program guide (EPG), which displays the graphics representing the broadcast programs.

3. The method as claimed in claim 1, wherein the broadcast programs that cannot be simultaneously selected, are in broadcast time slots which at least partially overlap.

4. The method as claimed in claim 3, wherein the broadcast programs that cannot be simultaneously selected comprise a first broadcast program and a second broadcast program, and
    wherein the user operation is input on one of: the graphics representing the first broadcast program, which overlaps a broadcast time slot of the second broadcast program; the graphics representing the second broadcast program which overlaps a broadcast time slot of the first broadcast program; the graphics representing the first broadcast program, which does not overlap the broadcast time slot of the second broadcast program; and the graphics representing the second broadcast program, which does not overlap the broadcast time slot of the first broadcast program.

5. The method as claimed in claim 3, wherein the broadcast programs that cannot be simultaneously selected comprise a first broadcast program and a second broadcast program, and
    the schedule recording is one of: the first broadcast program, the second broadcast program, the first broadcast program and a portion of the second broadcast program not overlapping a broadcast time slot of the first broadcast program, and the second broadcast program and a portion of the first broadcast program not overlapping a broadcast time slot of the second broadcast program.

6. The method as claimed in claim 1, wherein the user operation comprises selecting the graphics representing broadcast programs that cannot be simultaneously, using a pointer displayed on the GUI.

7. The method as claimed in claim 1, further comprising:
    performing scheduled viewing of the broadcast program corresponding to graphics highlighted according to the user operation.

8. An audio visual (AV) apparatus comprising:
    a graphical user interface (GUI) generator which generates a GUI which displays graphics representing broadcast programs that cannot be simultaneously selected, respectively and combines the GUI with a video to be displayed; and
    a controller which controls the GUI generator to highlight the graphics representing at least two of the broadcast programs having broadcast time which at least partially overlap according to a user's selection, to display overlapping portion of one of the graphics highlighted to be unhighlighted when one of the graphics highlighted is selected according to a user operation and to perform scheduled recording of the broadcast program corresponding to the graphics highlighted,
    wherein the controller highlights only the graphic selected when non-overlapping portion of one of the graphics highlighted is selected, and highlights the graphic selected and non-overlapping portion of another graphic which is not selected when overlapping portion of one of the graphics highlighted is selected.

9. The AV apparatus as claimed in claim 8, wherein the GUI comprises an electronic program guide (EPG), which displays the graphics representing the broadcast programs.

10. The AV apparatus as claimed in claim 8, wherein the broadcast programs that cannot be simultaneously selected, are in broadcast time slots which at least partially overlap.

11. The AV apparatus as claimed in claim 10, wherein the broadcast programs that cannot be simultaneously selected comprise a first broadcast program and a second broadcast program, and
    wherein the controller controls the GUI generator to display overlapping portion of one of the graphics highlighted to be unhighlighted based on the user operation being input on one of: the graphics representing the first broadcast program, which overlaps a broadcast time slot of the second broadcast program; the graphics representing the second broadcast program which overlaps a broadcast time slot of the first broadcast program; the graphics representing the first broadcast program, which does not overlap the broadcast time slot of the second broadcast program; and the graphics representing the second broadcast program, which does not overlap the broadcast time slot of the first broadcast program.

12. The AV apparatus as claimed in claim 10, wherein the broadcast programs that cannot be simultaneously selected comprise a first broadcast program and a second broadcast program, and
    the scheduled recording is one of: the first broadcast program, the second broadcast program, the first broadcast program and a portion of the second broadcast program not overlapping a broadcast time slot of the first broadcast program, and the second broadcast program and a portion of the first broadcast program not overlapping a broadcast time slot of the second broadcast program.

13. The AV apparatus as claimed in claim 8, wherein the user operation selecting one of the graphics highlighted is input by a pointer displayed on the GUI.

14. The AV apparatus as claimed in claim 8, wherein the controller performs scheduled viewing of the broadcast program according to the user operation.

15. A method for providing a graphical user interface (GUI), the method comprising:
- providing a GUI which displays graphics representing broadcast programs that cannot be simultaneously selected;
- receiving a user operation that is input by a pointer movable on the GUI, over the graphics representing broadcast programs that cannot be simultaneously selected, wherein the user operation is received when the pointer is located over one of the graphics;
- setting a user selection regarding the broadcast programs that cannot be simultaneously selected, according to the received user operation,
- dividing a first graphic of one of the broadcast programs into first portions and dividing a second graphic of another of the broadcast programs into second portions, wherein the first portions comprise one first portion and another first portion and the second portions comprise one second portion and another second portion, one of the first portions temporally overlapping one of the second portions; and
- highlighting only a graphic selected when non-overlapping portion of one of the graphics highlighted is selected, and highlighting the graphic selected and non-overlapping portion of another graphic which is not selected when overlapping portion of one of the graphics highlighted is selected.

16. A method for providing a graphical user interface (GUI), the method comprising:
- providing a GUI which displays items representing broadcast programs that cannot be simultaneously selected;
- receiving a user operation that is input by a pointer movable on the GUI over the items, wherein the user operation is received when the pointer is located over one of the items;
- setting a user selection regarding the broadcast programs that cannot be simultaneously selected, according to the received user operation; and
- dividing a first item of one of the broadcast programs into first portions and dividing a second item of another of the broadcast programs into second portions, wherein the first portions comprise one first portion and another first portion and the second portions comprise one second portion and another second portion, one of the first portions temporally overlapping one of the second portions; and
- highlighting only an item selected when non-overlapping portion of one of the items highlighted is selected, and highlighting the item selected and non-overlapping portion of another item which is not selected when overlapping portion of one of the items highlighted is selected.

* * * * *